(12) United States Patent
Shibayama et al.

(10) Patent No.: US 6,250,458 B1
(45) Date of Patent: Jun. 26, 2001

(54) LOW FRICTION COEFFICIENT PLASTIC CONVEYOR CHAIN

(75) Inventors: Katsutoshi Shibayama, Higashiosaka; Yoshihiro Murakami, Yao; Takashi Ishii, Daitou; Daisuke Sanada, Kanagawa-ken; Toshio Kubayashi, Suzuka, all of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/386,061

(22) Filed: Aug. 30, 1999

(30) Foreign Application Priority Data

Aug. 31, 1998 (JP) ................................................. 10-245778

(51) Int. Cl.[7] .................................................. B65G 17/38
(52) U.S. Cl. ............................ 198/851; 198/853; 198/957
(58) Field of Search .................................. 198/850, 851, 198/852, 853, 957

(56) References Cited

U.S. PATENT DOCUMENTS 5,309,705 * 5/1994 Takahashi et al. .................... 198/851
5,559,180 * 9/1996 Takahashi et al. .................... 524/512
6,068,112 * 5/2000 Kasai et al. ............................ 198/853

* cited by examiner

Primary Examiner—Douglas Hess
(74) Attorney, Agent, or Firm—Dann, Dorfman, Herrell and Skillman, P.C.; Henry H. Skillman

(57) ABSTRACT

A plastic conveyor chain includes a multiplicity of pinned links each having a flat load-carrying portion formed from a synthetic resin compound containing a polyacetal resin and a silicone-containing lubricant. Preferably, the silicone-containing lubricant contains, with respect to the weight of the synthetic resin compound, 0.5 to 2.0% by weight of silicone oil, 0.5 to 2.0% by weight of potassium titanate fiber, and 0.5 to 2.0% by weight of fatty ester obtained from a monobasic fatty acid and a monohydric alcohol. The thus formed flat load-carrying portion has a low friction coefficient such that the conveyor chain can achieve stable conveyance of articles even when the articles have an unstable bottom configuration.

11 Claims, 3 Drawing Sheets

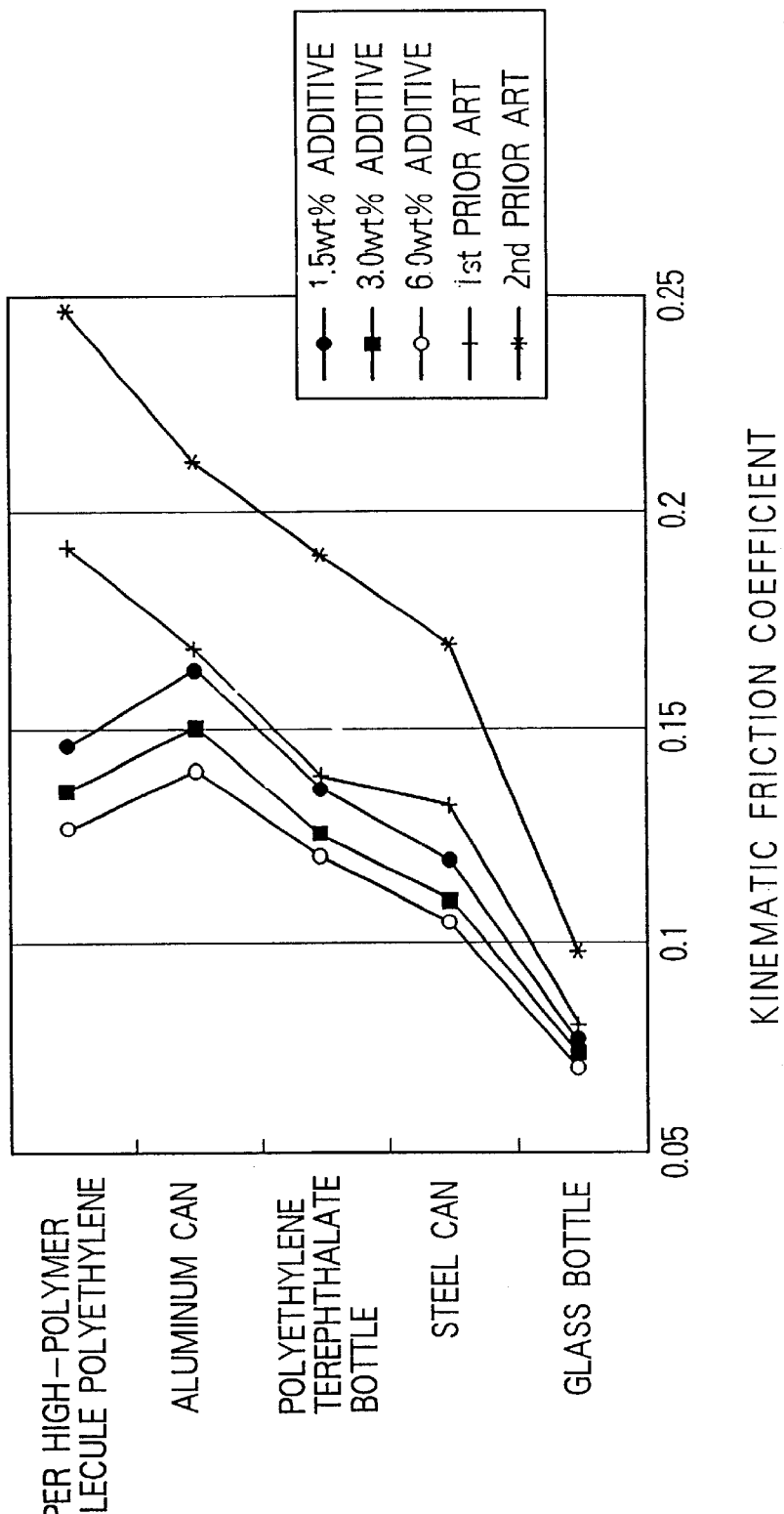

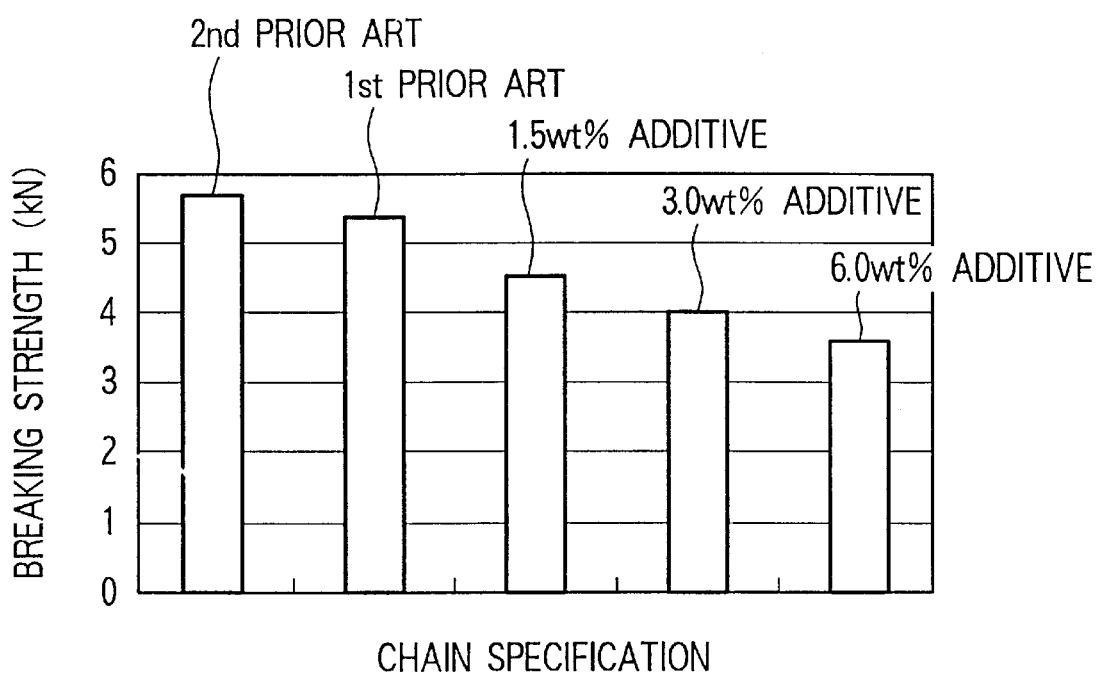

LOW FRICTION COEFFICIENT PLASTIC CONVEYOR CHAIN

BACKGROUND OF THE INVENTION

1. Field of the Invention

The present invention relates generally to a conveyor chain having a multiplicity of links pinned together and each including a flat load-carrying portion for carrying thereon an article to be conveyed by the conveyor chain. More particularly, this invention relates to a low friction coefficient plastic conveyor chain particularly suitable for use in an accumulate conveyor by which articles are accumulated at a given position on the conveyor chain while they are slipping on the flat load-carrying portions during continuous traveling of the conveyor chain, or a sorting conveyor by which articles are sent out from or collected into a given position on the flat load-carrying portions while the conveyor chain travels continuously.

2. Description of the Related Art

In a conveyor chain designed for use in the applications described above, links as a whole or at least flat load-carrying portions of the links are required to have a small friction coefficient so that articles can slip on the flat load-carrying portions. To meet with this requirement, the links or the flat load-carrying portions are conventionally formed from a synthetic resin material composed of a polyacetal resin blended with a fluorine resin or a long-chain alkyl ester-based lubricant.

The conventional plastic conveyor chain has been found unsatisfactory as a container having a relatively unstable bottom configuration, such as a petaloidal-shaped PET (polyethylene terephthalate) bottle, has recently distributed in the market. This is because containers having such unstable bottom configuration are liable to fall over during conveyance or as they are caused to slip on the flat load-carrying portions of the conventional plastic conveyor chain.

To deal with this problem, two approaches have been taken. According to a first prior approach, chamfered front and rear corner edges of each flat load-carrying portion and the spacing between adjacent links are made small so as not to catch the bottoms of the containers. A second approach relies on a satin finishing effected on the load-carrying surface to reduce a contact area relative to the containers, thereby decreasing a frictional resistance between the satin-finished load-carrying surface and the containers.

The first approach is found somewhat successful, but the second approach is not because the satin-finished load-carrying surface becomes worn away in a relatively short time. Since the worn-out load-carrying surface has an increased friction coefficient, causing the container falling-over problem to recur.

From the still unsatisfactory results of the prior approaches, the present inventors have concluded that the links as a whole or at least the flat load-carrying portions of the links need to be formed from a material having a smaller friction coefficient than the materials used in the conventional conveyor chain.

SUMMARY OF THE INVENTION

It is accordingly an object of the present invention to provide a conveyor chain composed of a multiplicity of pinned links each having a low friction coefficient flat load-carrying portion formed from a specific synthetic resin material or compound.

To achieve the foregoing object, the present invention provides a conveyor chain comprising a multiplicity of links pivotally connected together by pins, each of the links having a flat load-carrying portion for carrying thereon an article to be conveyed by the conveyor chain. At least the flat load-carrying portion of each link is formed from a synthetic resin material of a composition comprising a polyacetal resin and a silicone-containing lubricant.

The flat load-carrying portion of the conveyor chain has a smaller kinematic friction coefficient than the corresponding portion of the conventional conveyor chain and hence is able to achieve stable conveyance of articles for a long time even when the articles have an unstable bottom configuration. During accumulation or sorting of the article, a frictional resistance acting between the flat load-carrying portions and the articles can be maintained at a considerably small value. Thus, the conveyor chain can travel under reduced tension, has a long service life, and can operate at a reduced running cost.

Preferably, the silicone-containing lubricant contains, with respect to the weight of the synthetic resin material, 0.5 to 2.0% by weight of silicone oil, 0.5 to 2.0% by weight of potassium titanate fiber, and 0.5 to 2.0% by weight of fatty ester obtained from a monobasic fatty acid and a monohydric alcohol.

The above and other objects, features and advantages of the present invention will become apparent to those versed in the art upon making reference to the following detailed description and the accompanying sheets of drawings in which a certain preferred embodiment incorporating the principle of the present invention is shown by way of illustrative example.

BRIEF DESCRIPTION OF THE DRAWINGS

FIG. 3 is a graph showing the kinematic friction coefficients of conveyor chains according to the present invention as compared to the kinematic friction coefficients of the conventional conveyor chains; and FIG. 4 is a graph showing the breaking strengths of the inventive conveyor chains and conventional conveyor chains.

DETAILED DESCRIPTION OF THE PREFERRED EMBODIMENT

Figure 1:
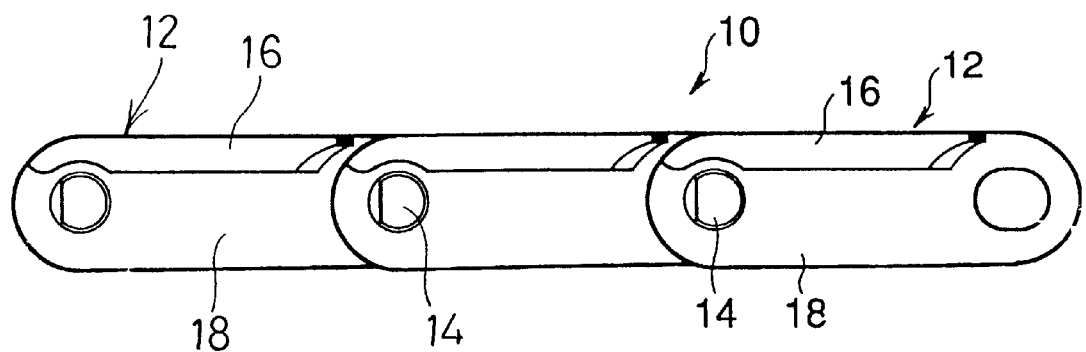
FIG. 1 is a front elevational view of a length of a conveyor chain according to the present invention.
Figure 2:
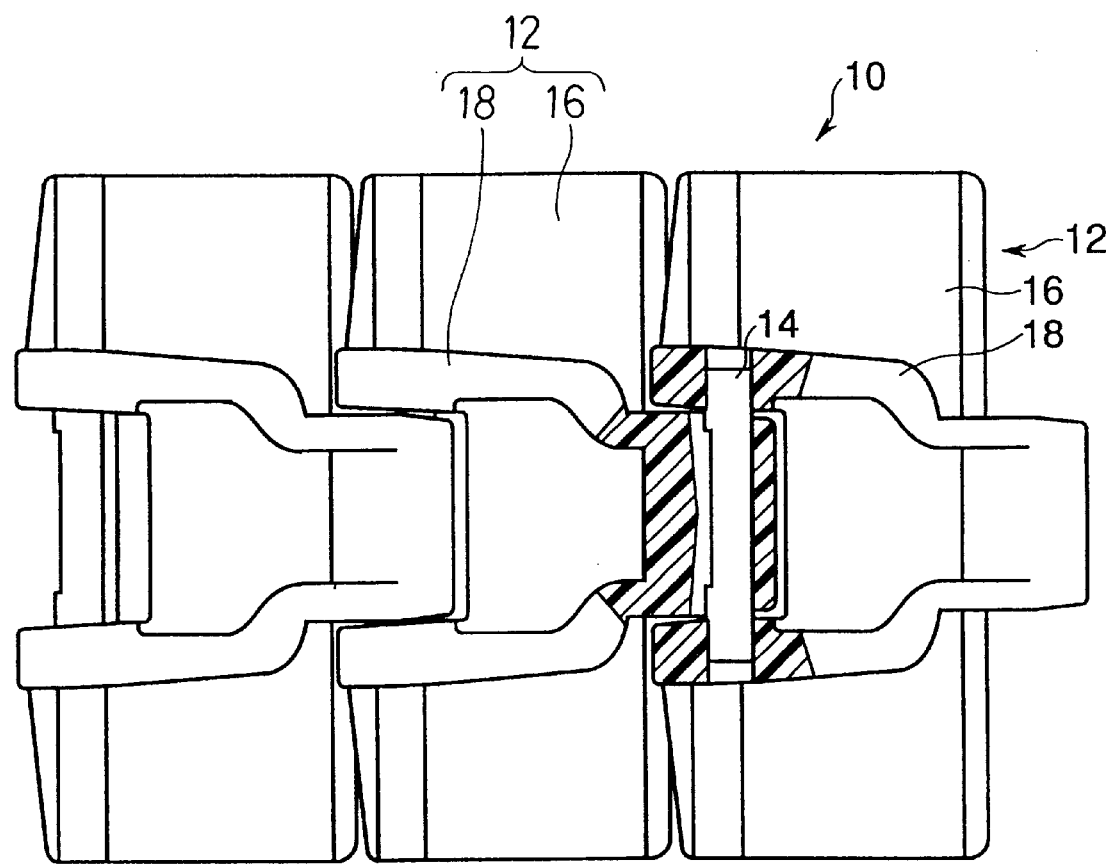
FIG. 2 is a bottom view of FIG. 1 with a part broken away to show the pinned connection.

Referring now to the drawings and FIGS. 1 and 2 in particular, there is shown a length of a conveyor chain according to an embodiment of the present invention.

The conveyor chain 10 includes a multiplicity of links 12 of identical configuration pivotally connected together by pins 14. Each of the links 12 includes a flat load-carrying portion 16 and a connecting link portion 18. In the illustrated embodiment, the flat load-carrying portion 16 and the connecting link portion 18 are formed integrally with each other. These parts 16, 18 may be formed as separate parts which are then assembled together into a single complete link 12. Though not shown, the flat load-carrying portion 16 may have a number of small through-holes distributed in a desired pattern over a given or the entire area of the flat load-carrying portion 16.

The conveyor chain 10 is designed for use in, for example, an accumulate conveyor by which articles to be conveyed are accumulated at a given position on the conveyor chain 10 while they are slipping on the flat load-carrying portions 16 of the conveyor chain 10 during continuous traveling of the conveyor chain 10, or a sorting conveyor by which articles carried on the flat load-carrying portions 16 of the conveyor chain 10 are sent out from or collected into a given position on the conveyor chain 10 while the conveyor chain travels continuously. For these applications, the conveyor chain 10 should preferably have a low friction coefficient at least at its flat load-carrying portions 16. In view of the manufacturing manpower, management manpower and so on, it is practically advantageous that the link 12 as a whole is formed from a suitable synthetic resin material or compound, thereby automatically achieving the low friction coefficient as required for the flat load-carrying portion 16.

The links 12 of the conveyor chain 10 shown in FIGS. 1 and 2 are molded of a synthetic resin material. The synthetic resin material has a composition comprising a polyacetal resin and a silicone-containing lubricant. The term "silicone-containing lubricant" is used herein to refer to a lubricant containing silicone oil as a main composition. By the silicone-containing lubricant, the friction coefficient of the flat load-carrying portions 16 of the conveyor chain 10 is lowered to such an extent that stable conveyance of articles carried on the flat load-carrying portions 16, an elongated lifetime of the conveyor chain 10, and a reduced running cost of the conveyor chain 10 can be attained.

The polyacetal resin is a main composition of the synthetic resin material, as in the same manner as the conventional conveyor chain. According to the present invention, preferred examples of the polyacetal include homopolymers or copolymers with cyclic ether compound, containing an oxymethylene chain as a main constituent obtained from polymerization of formaldehyde or trioxane used as a main raw material. These polyacetals have a melt index (MI) in the range of 0.01 to 60 (at 190° C., under a 2160-gram force as stipulated by ASTM-D1238). In general, the polyacetal is stabilized against decomposition by end-capping the polymer chains, then combined with a stabilizer or an antioxidizing agent.

According to the present invention, the polyacetal resin used as a base resin is combined with a silicone-containing lubricant, as described above. Preferred examples of the silicone-containing lubricant include a silicone oil, a potassium titanate fiber, and a fatty ester obtained from monobasic fatty acid and monohydric alcohol. These components of the silicone-containing lubricant preferably have particular proportions described below.

The silicone oil is added to improve the abrasion resistance. The amount of addition of the silicone oil is in the range of 0.5 to 2.0% by weight of the entire synthetic resin material. If the amount of addition of silicone oil is less than 0.5% by weight, a sufficient abrasive resistant property cannot be obtain. On the other hand, more than 2.0% by weight of silicone oil may deteriorate the molding properties of the synthetic resin compound and the external appearance of the link or the flat load-carrying portion. The silicone oil preferably has a kinematic viscosity above 1,000,000 centistokes (cSt) at 25° C. If the kinematic viscosity of silicone oil is below 1,000,000 cSt, the resultant link or its flat load-carrying portion may have poor fabrication qualities.

Eligible examples of the silicone oil include a silicone oil consisting of poly(dimethylsiloxane), an epoxy-derivatized silicone oil such as poly(dimethylsiloxane) with epoxy group, an amino-derivatized silicone oil such as poly(dimethylsiloxane) with amino group, and an alcohol-derivatized silicone oil such as poly(dimethylsiloxane) with alcoholic hydroxyl group. These silicone oils have kinematic viscosities above 1,000,000 cSt at 25° C.

The potassium titanate fiber, when used in combination with the silicone oil and fatty ester, has the effect of improving the abrasion resistance of the polyacetal resin. The amount of addition of the potassium titanate fiber is in the range of 0.5 to 2.0% by weight of the entire synthetic resin material. If the amount of addition of the potassium titanate fiber is less than 0.5% by weight, a sufficient degree of abrasion resistance cannot be obtain. On the other hand, more than 2.0% by weight of potassium titanate fiber is not desirable from the viewpoint of abrasion resistance.

The potassium titanate fiber used in the present invention is a fine while needle-like single-crystal fiber having an average fiber length of 5 to 120 $\mu$m, preferably 10 to 20 $\mu$m, and an average fiber diameter of 0.1 to 1.0 $\mu$m, preferably 0.2 to 0.5 $\mu$m. In order to provide an improved adhesion with the polyacetal resin, a finishing agent may be used on the potassium titanate fiber. Examples of the finishing agent include an aminosilane-based finishing agent, an epoxysilane-based finishing agent, and a titanate-based finishing agent. Among these examples, the aminosilane-based finishing agent is preferable.

The fatty ester is added to improve the sliding properties to thereby lower the friction coefficient of the flat load-carrying portions 16 of the conveyor chain 10. The amount of addition of the fatty ester is in the range of 0.5 to 2.0% by weight of the entire synthetic resin material. If the amount of addition of the fatty ester is less than 0.5% by weight, a sufficient effect of improving the sliding properties cannot be attained. On the other hand, more than 2.0% by weight of fatty ester may significantly deteriorate the qualities of the polyasetal resin.

The fatty ester used in the present invention may be a fatty ester obtained through condensation reaction between a monobasic fatty acid containing 5–32 carbon atoms and a monohydric alcohol containing 2–30 carbon atoms. The monobasic fatty acid may be a saturated fatty acid selected from the group consisting of n-caproic acid, n-capric acid, undecylic acid, lauric acid, tridecylic acid, myristic acid, palmitic acid, stearic acid, behenic acid, lignoceric acid, cerotic acid, montanic acid and malissic acid, or an unsaturated fatty acid selected from the group consisting of oleic acid, elaidic acid, linoleic acid, linolenic acid, arachidonic acid, brassidic acid, erucic acid, and ricinolic acid. Examples of the monohydric alcohol include propyl alcohol, isopropyl alcohol, butyl alcohol, octyl alcohol, capryl alcohol, lauryl alcohol, myristyl alcohol, stearyl alcohol and behenyl alcohol.

Preferred examples of the fatty ester are those obtained from condensation reaction between a carboxylic acid group of monobasic fatty acid containing 12–22 carbon atoms and a hydroxy group of monohydric alcohol containing 2–30 carbon atoms. Among others, a fatty ester, which is obtained from condensation reaction between one fatty acid selected from lauric acid, myristic acid, palmitic acid, stearic acid and behenic acid, and one monohydric alcohol selected from myristyl alcohol, stearyl alcohol and behenyl alcohol, is preferable. Examples of such preferable fatty acid are stearylstearate and behenylbehenate.

In the synthetic resin material of the present invention, the silicone oil, the potassium titanate fiber and the fatty ester obtained from monobasic fatty acid and monohydric alcohol are present at the proportions specified above, with the balance (i.e., 94–98.5% by weight) being the polyacetal resin. The synthetic resin material may further contain impurities as unavoidable ingredient and a small amount of additives added to improve other physical properties.

In order to confirm advantageous effects of the present invention, a comparative test was made using conveyor chains according to the present invention and conventional conveyor chains. The inventive conveyor chains were prepared such that each of the three components (i.e., silicone oil, potassium titanate fiber and fatty ester) of the silicon-containing lubricant was 0.5, 1.0 or 2.0% by weight of the synthetic resin material, with the balance being polyacetal resin. The first conventional conveyor chain was formed from a polyacetal resin containing an additive consisting of a long-chain alkyl ester-based chemical lubricant. The second conventional chain was formed from a natural grade polyacetal resin with no additives contained therein.

These conveyor chains were used in combination with various companion materials to measure the kinematic friction coefficients. The companion materials were a super high-polymer molecule polyethylene which may be used as a rail member supporting the underside surface of each conveyor chain, an aluminum can, a polyethylene terephthalate bottle, a steel can and a glass bottle which may be used as an objects to be carried on the conveyor chains. During measurement, the conveyor chains each prepared to have the structure shown in FIG. 1 were driven to run at 50 m/min, and each of the companion materials was carried on respective flat load-carrying portions of the conveyor chains without supplying any lubricating fluid on the flat load-carrying portions. For the measurement, each companion material was suspended from a push-pull dial gauge or indicator to create an accumulated state in which the companion material can slip at a given position on the flat load-carrying portions of the running conveyor chains. The measured value of the dial indicator was divided by the mass of each companion material to calculate a kinematic friction coefficient. The results of measurement are shown in FIG. 3.

As shown in FIG. 3, all the inventive conveyor chains have smaller kinematic friction coefficients than the first and second conventional conveyor chains. As enumerated below in Table 1, the inventive conveyor chains can achieve certain friction coefficient reducing effects even through the reduction degrees vary depending on the companion materials.

TABLE 1

| FRICTION COEFFICIENT REDUCTION RATE (AVERAGE) | | |
|---|---|---|
| Amount of Additive (Silicone-containing Lubricant) | Reduction Rate Relative to 1st Conventional Chain | Reduction Rate Relative to 2nd Conventional Chain |
| 1.5 wt % | about 10% | about 30% |
| 3.0 wt % | about 16% | about 35% |
| 6.0 wt % | about 20% | about 40% |

It appears clear from FIG. 3 and Table 1 that the kinematic friction coefficient becomes smaller as the amount of additive (the silicon-containing lubricant) increases. So far as the friction coefficient reducing effect is concerned, a greater amount of silicon-containing lubricant appears to be favorable. More concretely, the amount of silicone-containing lubricant is preferably more than 3.0% by weight of the entire synthetic resin material. This means that three component of the silicone-containing lubricant are each in excess of 1.0% by weight of the entire synthetic resin material.

On the other hand, increasing the amount of silicone-containing lubricant may encounter a problem. FIG. 4 shows breaking strengths of the respective conveyor chains taken by a measurement. As shown in FIG. 4, the breaking strength decreases with an increase in amount of the lubricant added. It will be understood from FIG. 4 that a conveyor chain formed from a synthetic resin compound containing more than 6% by weight of silicone-containing lubricant (containing more than 2% by weight of each of the three constituents) probably shows a 35% reduction of the breaking strength as compared to the first conventional conveyor chain. This means that as the amount of silicon-containing lubricant increases, the resultant conveyor chain becomes more difficult to maintain the necessary strength.

It was further experimentally proved that the injection-molding properties of a synthetic resin material and the external appearance of the resultant conveyor chain become worse as the amount of silicone-containing lubricant contained in the the synthetic resin material increases.

Obviously, various minor changes and modifications of the present invention are possible in the light of the above teaching. It is therefore to be understood that within the scope of the appended claims the present invention may be practiced otherwise than as specifically described.

What is claimed is:

1. A conveyor chain comprising:
    a multiplicity of links pivotally connected together by pins, each of said links having a flat load-carrying portion for carrying thereon an article to be conveyed by said conveyor chain; and
    at least said flat load-carrying portion of said each link being formed from a synthetic resin material, said synthetic resin material having a composition comprising a polyacetal resin and a silicone-containing lubricant,
    said silicone-containing lubricant containing, with respect to the weight of said synthetic resin material, 0.5 to 2.0% by weight of silicone oil, 0.5 to 2.0% by weight of potassium titanate fiber, and 0.5 to 2.0% by weight of fatty ester obtained from a monobasic fatty acid and a monohydric alcohol.

2. A conveyor chain according to claim 1, wherein said silicone oil has a kinetic viscosity in the range of 1,000,000 centistokes at 25° C.

3. A conveyor chain according to claim 2, wherein said silicone oil is one selected from the group consisting of a silicone oil formed of poly(dimethylsiloxane), an epoxy-derivatized silicone oil, an amino-denatured silicone oil, and an alcohol-derivatized silicone oil.

4. A conveyor chain according to claim 1, wherein said potassium titanate fiber is a fine while needle-like single-crystal fiber having an average fiber length of 5 to 120 $\mu$m and an average fiber diameter of 0.1 to 1.0 $\mu$m.

5. A conveyor chain according to claim 4, wherein said potassium titanate fiber has an average fiber length of 10 to 20 $\mu$m and an average fiber diameter of 0.2 to 0.5 $\mu$m.

6. A conveyor chain according to claim 1, wherein said fatty ester is obtained through condensation reaction between a monobasic fatty acid having 5–32 carbon atoms and a monohydric alcohol having 2–30 carbon atoms.

7. A conveyor chain according to claim 6, wherein said monobasic fatty acid is a saturated fatty acid selected from the group consisting of n-caproic acid, n-capric acid, undecylic acid, lauric acid, tridecylic acid, myristic acid, palmitic acid, stearic acid, behenic acid, lignoceric acid, cerotic acid, montanic acid and malissic acid, and said monohydric alcohol is one selected from the group consisting of propyl alcohol, isopropyl alcohol, butyl alcohol, octyl alcohol, capryl alcohol,,lauryl alcohol, myristyl alcohol, stearyl alcohol and behenyl alcohol.

8. A conveyor chain according to claim 6, wherein said monobasic fatty acid is an unsaturated fatty acid selected from the group consisting of oleic acid, elaidic acid, linoleic acid, linolenic acid, arachidonic acid, brassidic acid, erucic acid, and ricinolic acid, and said monohydric alcohol is one selected from the group consisting of propyl alcohol, isopropyl alcohol, butyl alcohol, octyl alcohol, capryl alcohol, lauryl alcohol, myristyl alcohol, stearyl alcohol and behenyl alcohol.

9. A conveyor chain according to claim 6, wherein said fatty ester is obtained through condensation reaction between a carboxylic acid group of a monobasic fatty acid containing 12–22 carbon atoms and a hydroxy group of a monohydric alcohol containing 2–30 carbon atoms.

10. A conveyor chain according to claim 9, wherein said monobasic fatty acid is a saturated fatty acid selected from the group consisting of lauric acid, myristic acid, palmitic acid, stearic acid and behenic acid, and said monohydric alcohol is one selected from the group consisting of myristyl alcohol, stearyl alcohol and behenyl alcohol.

11. A conveyor chain according to claim 10, wherein said fatty ester is stearylstearate or behenylbehenate.

* * * * *